United States Patent [19]

Hirose et al.

[11] Patent Number: 4,916,587

[45] Date of Patent: Apr. 10, 1990

[54] TILTING DEVICE OF VEHICLE HEADLIGHT

[75] Inventors: Hitoshi Hirose; Masahiro Kusagaya; Nobumi Yokoyama, all of Shizuoka, Japan

[73] Assignee: Koito Seisakusho Co., Ltd., Tokyo, Japan

[21] Appl. No.: 347,689

[22] Filed: May 5, 1989

[30] Foreign Application Priority Data

May 6, 1988 [JP] Japan ................................ 63-110118

[51] Int. Cl.[4] ........................... B60Q 1/06; F21M 3/18

[52] U.S. Cl. ....................................... 362/66; 362/273; 362/289; 362/430

[58] Field of Search ..................... 362/66, 69, 70, 285, 362/287, 289, 273, 275, 428, 430

[56] References Cited

U.S. PATENT DOCUMENTS

| | | | |
|---|---|---|---|
| 3,931,511 | 1/1976 | Puyplat | 362/61 |
| 4,186,428 | 1/1980 | Deverrewaere | 362/66 |
| 4,197,491 | 4/1980 | Cunnell et al. | 315/82 |
| 4,217,631 | 8/1980 | Bergkvist | 362/66 X |
| 4,574,334 | 3/1986 | Igura | 362/66 |

FOREIGN PATENT DOCUMENTS

| | | | |
|---|---|---|---|
| 3445703 | 6/1985 | Fed. Rep. of Germany . | |
| 64548 | 4/1986 | Japan | 362/66 |
| 2101768 | 1/1983 | United Kingdom | 362/66 |

*Primary Examiner*—Ira S. Lazarus
*Assistant Examiner*—Peggy Neil
*Attorney, Agent, or Firm*—Browdy and Neimark

[57] ABSTRACT

A tilting device of a vehicle headlight having a tiltable member defining the direction of the light beam and being tiltably supported on a supporting member. The tilting device comprises an adjust rod being rotatable and displaceable in the fore and aft directions and supported on the supporting member with the front end being connected to the tiltable member and the rear end projecting rearward of the supporting member, and a drive mechanism for rotating the adjust rod and being mounted on the rear surface of the supporting member. The drive mechanism comprises an output shaft slidably and irrotatably connected to the rear end of the adjust rod, a detecting device for detecting the position of the adjust rod and disposed coaxially with the output shaft, a drive mechanism for rotating the output shaft and a transmit mechanism for trasmitting the rotation of the output shaft to a rotatable portion of the detecting device.

4 Claims, 14 Drawing Sheets

TILTING DEVICE OF VEHICLE HEADLIGHT

BACKGROUND of the INVENTION

1. Field of the Invention

The present invention relates to a headlight device for a vehicle such as an automobile and the like and, particularly to a tilting device of the headlight for changing the direction of the light beam.

2. Description of Prior Art (FIG. 14)

Various headlights have been proposed and utilized, and it is usually required that the light beam of the headlight can be directed to a desired direction so as to improve the safety in the traffic.

For end, a member defining the direction of the light beam such as a headlight unit or a reflector and the like is mounted tiltably on a supporting member such as a member secured to the chasis of the vehicle, and a tilting or inclinating mechanism is provided for tilting the tiltable member as desired. The headlight unit generally consists of a reflector and a light source which are disposed in a lamp space defined by a lamp body and a lens covering the front opening of the lamp body.

In adjusting the direction of the light beam, there has been adopted two steps, i.e. the initial aiming adjustment which is performed when the headlight is mounted on the vehicle and prior to usage or on the initial inspection process, and a leveling adjustment which is performed to compensate the change in the load of the vehicle such as passengers or the loading of the vehicle and the like. The change in the load of the vehicle usually changes the direction of the light beam in the vertical direction. The initial aiming adjustment is usually performed manually, and the leveling adjustment is usually performed through a remote controlled actuating mechanism.

The aiming adjustment is usually effected to change the direction of the light beam horizontally and vertically and the adjusting mechanism are provided at two separate points, and the actuating mechanism for the leveling adjustment is usually provided on the aiming adjusting point for effecting the adjustment in the vertical direction. Some prior art tilting device integrally comprises the aiming adjust mechanism and the leveling adjust mechanism.

FIG. 14 shows schematically a prior art headlight device a having the tilting device of above mentioned type. Shown at b is the tilting device, at c is a casing secured to the inner surface of the rear wall of a lamp housing d, at e is a worm wheel rotatably supported on the casing c and not being displaceable in the axial direction, at f is a tubular member displaceable in the axial direction and threadingly engaging with the worm wheel e, at h is an adjust rod having screw threads along the main portion of the length for engaging with the tubular member f. A ball i is formed on the front end of the rod h, and the rear end of the rod h projects from the rear surface of the lamp housing d. Shown at k is a headlight unit tiltably supported on the lamp housing d. A receptacle 1 is supported on the lower end for engaging with the ball i to constitute a ball joint.

A drive unit including a motor, worm gears and the like (not shown) is disposed in the casing c to rotate the worm wheel e.

In the initial aiming adjustment, the rod h is rotated relative to the tubular member f so as to be threaded into or out thereof. The rod h moves axially, and the headlight unit k tilts in the vertical direction and the direction of the light beam is adjusted.

When the worm wheel e is rotated by the drive unit through the remote control device the rod h moves together with the tubular member f and a similar adjustment is performed, which is the leveling adjustment.

In the vehicle headlight device it is essential to perform the initial aiming adjustment, but the mechanism for the leveling adjustment is not essential.

According to the prior art tilting device b, it is convenient that the initial aiming adjusting means and the leveling adjusting means are provided integrally. However, it is difficult to omit the leveling adjusting means, and the lamp housing d is exclusively used to the tilting device b. Thus, it is required to provide a separate aiming adjusting means for a headlight device wherein the leveling adjustment is not required. In such case it is required to prepare various types of tilting devices which increases the number of parts, and tools and jigs and the like for producing the same, thereby increasing the cost.

An object of the invention is to solve the problems above mentioned.

SUMMARY of the INVENTION

According to the present invention, there is provided a tilting device of a vehicle headlight having a tiltable member defining the direction of the light beam and being tiltably supported on a supporting member; the tilting device comprises an adjust rod being supported on the supporting member with the front end being connected to the tiltable member and the rear end projecting rearward of the supporting member and being displaceable in the fore and aft direction when rotated, and a drive mechanism for rotating the adjust rod and being mounted on the rear surface of the supporting member; the drive mechanism comprises an output shaft slidably and irrotatably connected to the rear end of the adjust rod, detecting means for detecting the position of the adjust rod and disposed coaxially with the output shaft, drive means for rotating the output shaft and transmit means for transmitting the rotation of the output shaft to a rotatable portion of the detecting means.

Thus, according to the present invention, the aiming adjust mechanism for performing the initial aiming adjustment is mounted on the supporting member and being releaseably connected to the leveling adjust mechanism, thus, the aiming adjust mechanism can be used on various tilting device independently of the leveling adjust mechanism and is mounted on a predetermined position of the supporting member. Further, the leveling adjust mechanism is mounted on the rear side of the supporting member, thus, it is easy to mount or dismount the leveling adjust mechanism.

BRIEF DESCRIPTION of the DRAWINGS

Further objects and advantages of the invention will become apparent from the following detailed description in conjunction with accompanying drawings, in which:

FIG. 1 is an enlarged sectional view of the essential portion of the headlight device;

FIG. 2 is a front view;

FIG. 3 is a section view taken along line III—III in FIG. 2;

FIG. 4 is a section view taken along line IV—IV in FIG. 2;

FIG. 5 is a section view taken along line V—V in FIG. 2;

FIG. 6 is an enlarged sectional view taken generally along line VI—VI in FIG. 1;

FIG. 7 is an exploded perspective view of a second aiming adjust mechanism;

FIG. 8 is an enlarged rear view of the essential portion of a drive mechanism;

FIG. 9 is an enlarged sectional view taken generally along line IX—IX in FIG. 8;

FIG. 10 is an enalarged exploded perspective view of the essential portion of the drive mechanism;

FIG. 11 is a sectional view showing one example of the headlight device not having the drive mechanism;

DETAILED DESCRIPTION of PREFERRED EMBODIMENTS

Figure 1:
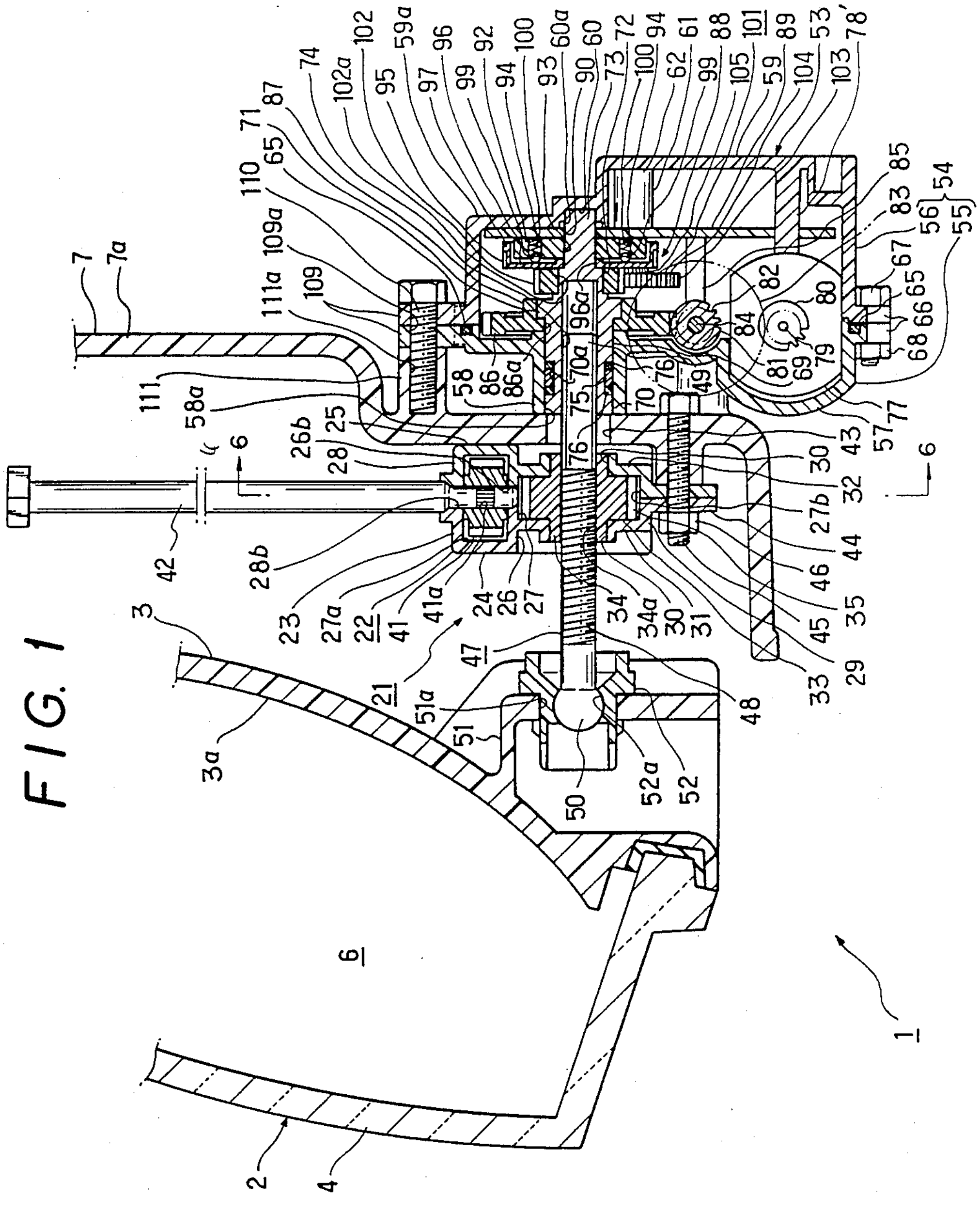
FIG. 1 through FIG. 11 show a headlight device according to a first embodiment of the invention.

First Embodiment (FIG. 1 through FIG. 11)

The first embodiment shown in FIG. 1 through FIG. 11 is a headlight device 1 of a movable unit type.

Headlight Unit, Lamp Housing (FIGS. 1-5, FIG. 11)

The headlight device 1 comprises a headlight unit 2 which consists of a lamp body 3, a lens 4 being mounted on the lamp body 3 to cover the front opening thereof, and an electric bulb 5 supported on the lamp body 3. The lamp body 3 has a forward facing reflective surface 3*a*, and the bulb 5 is supported on a bulb mounting bore 3*b* formed in the generally central portion of the reflective surface 3*a*, and the light emitting portion of the electric bulb 5 is disposed in a lamp space 6 which is defined between the reflective surface 3*a* of the lamp body 3 and the lens 4.

A lamp housing 7 formed of a synthetic resin material and having a generally concave form having a front opening is fixedly mounted on a vehicle body 8.

Figure 2:
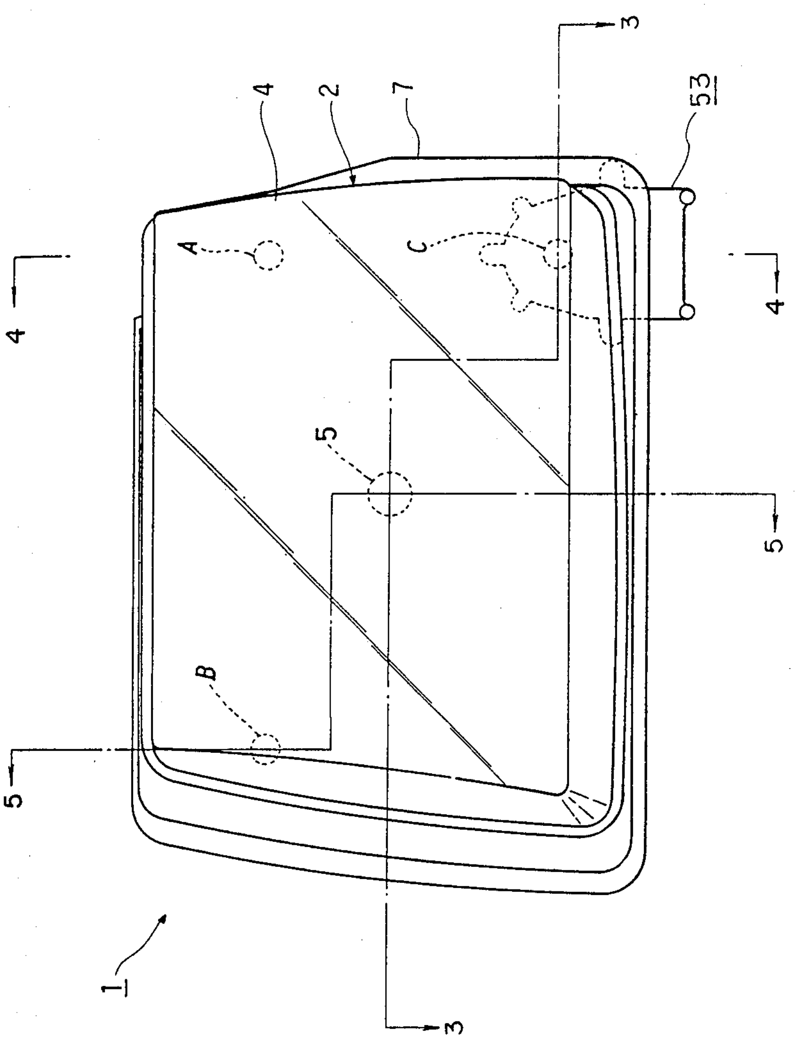

The points A, B and C (FIG. 2) are points on which the headlight unit 2 is supported on the lamp housing 7. Among which points, the point A is a pivotally movable supporting point, and the point B being spaced from the point A in the horizontal direction and the point C being spaced from the point A in the vertical direction are adjusting portions for adjusting the space between the headlight unit 2 and the lamp housing 7. When the adjusting portions are adjusted the headlight unit 2 can be tilted in the left and right directions (the left side in FIG. 2 is defined as the left direction) and in the up and down directions.

Figure 4:
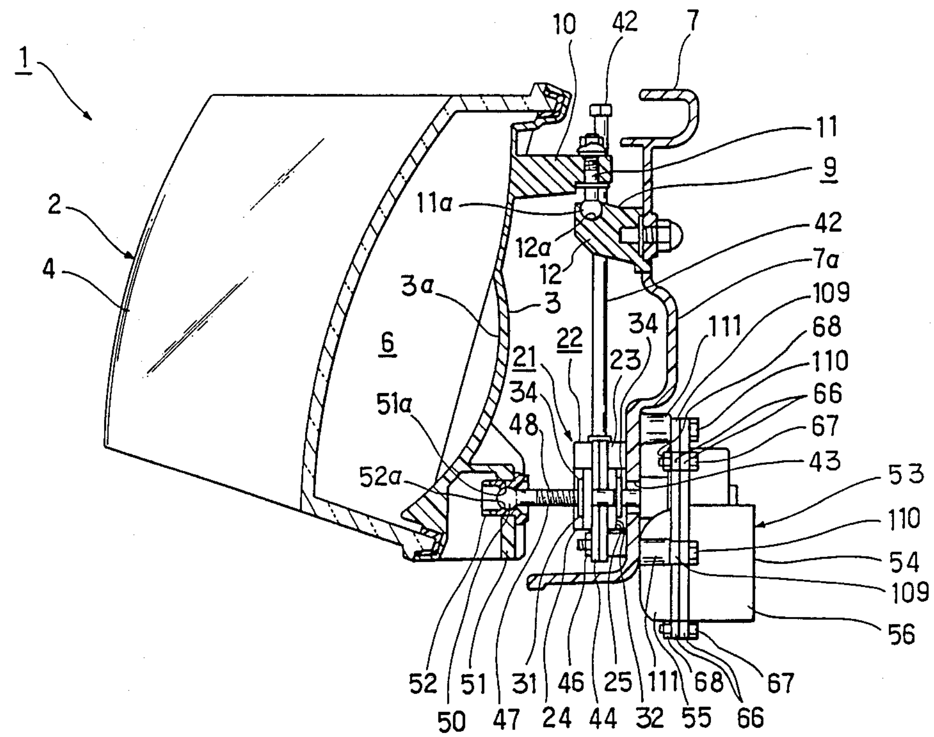

Pivotal Supporting Portion (FIG. 4)

The pivotal supporting portion is constituted of a pivotal supporting mechanism 9, and the mechanism 9 comprises a supported portion 10 formed on the lamp body 3 and a receptacle 12 mounted on the lamp housing 7.

The supported portion 10 is formed on the rear surface of the lamp body 3 to project rearward, and a supporting shaft 11 formed of a metal is secured to the rear end of the shaft 11 and has a spherical portion 11*a* integrally on the lower end of the shaft 11.

The receptacle 12 is formed of a synthetic resin material and is mounted on the lamp housing 7 to project forward and has a spherical recess 12*a* for pivotally receiving the spherical portion 11*a* of the supporting shaft 11.

Thus, the headlight unit 2 is pivotally supported on the lamp housing 7 around the point A defined by the engagement between the spherical portion 11*a* of the supporting shaft 11 and the spherical recess 12*a* in the receptacle 12.

Figure 5:
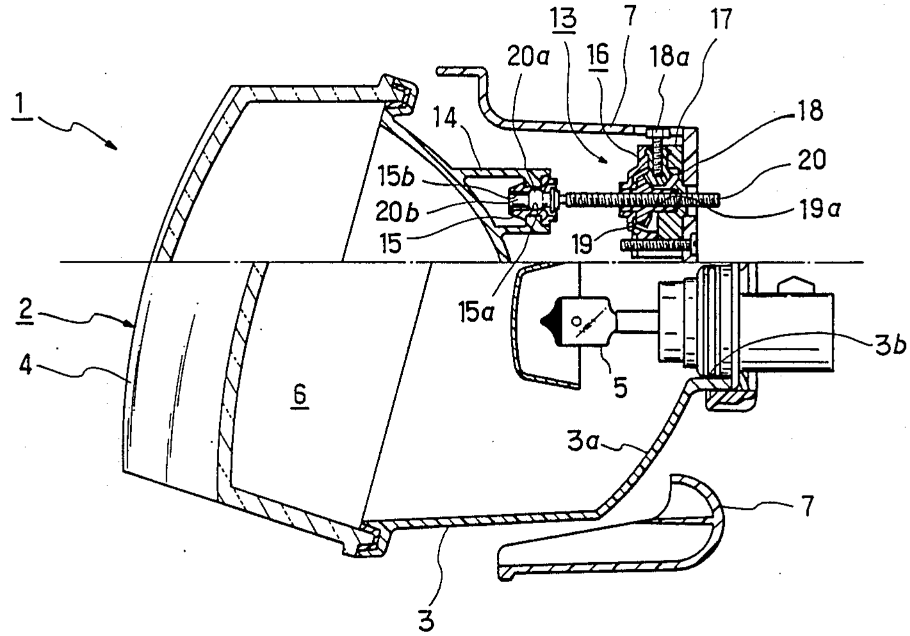

First Aiming Adjust Mechanism (FIG. 5)

The mechanism of the point B is constituted of an adjust mechanism 13 (referred as the first aiming adjust mechanism) which essentially comprises a receptacle member 15, a gear unit 16, an actuating rod 18*a* and an aiming adjust shaft 20.

The receptacle member 15 is formed of a synthetic resin material and is supported on the rear end of a generally tubular projecting portion 14 which is formed on the rear surface of the lamp body 3. The receptacle member 15 has a spherical recess 15*a* opening rearward and a groove like bore portion 15*b* extending forward from the front end of the spherical recess 15*a*.

The gear unit 16 comprises a casing 17 fixedly mounted on the front surface of the lamp housing 7, a first bevel gear 18 rotatably mounted in the casing 17 around a vertical axis, and a second bevel gear 19 meshingly engaging with the first gear 18. The second gear 19 has screw threads 19*a* therein for engaging with the aiming adjust shaft 20 which extends in the fore and aft directions. The actuating rod 18*a* is secured to the first gear 18 with the upper end portion projecting out of the casing 17.

The aiming adjust shaft 20 has screw threads along the major portion of the length and, on the front end portion, a spherical portion 20*a* and a plate like projection 20*b* projecting from the front end of the spherical portion 20*a*. The spherical portion 20*a* is rotatably received in the spherical recess 15*a* of the receptacle member 15 and the projection 20*b* is slidably received in the bore portion 15*b*. Thus, the adjust shaft 20 is connected irrotatably to the receptacle member 15. The point B is defined by the spherical portion 20*a* and the spherical recess 15*a*.

When the first gear 18 is rotated through the rod 18*a*, the second gear 19 rotates, the adjust shaft 20 displaces in the fore and aft direction, and the receptacle member 15 displaces in the same direction. Accordingly, the headlight unit 2 tilts generally in the left and right direction around an axis connecting the points A and C. The direction of the light beam changes in the left and right directions. As the result, the aiming adjustment in the left and right directions is performed.

Second Aiming Adjust Mechanism (FIGS. 1,3,4,6,7)

The adjust mechanism at the point C is constituted of an aiming adjust mechanism 21 which is referred as a second adjust mechanism.

Figure 6:
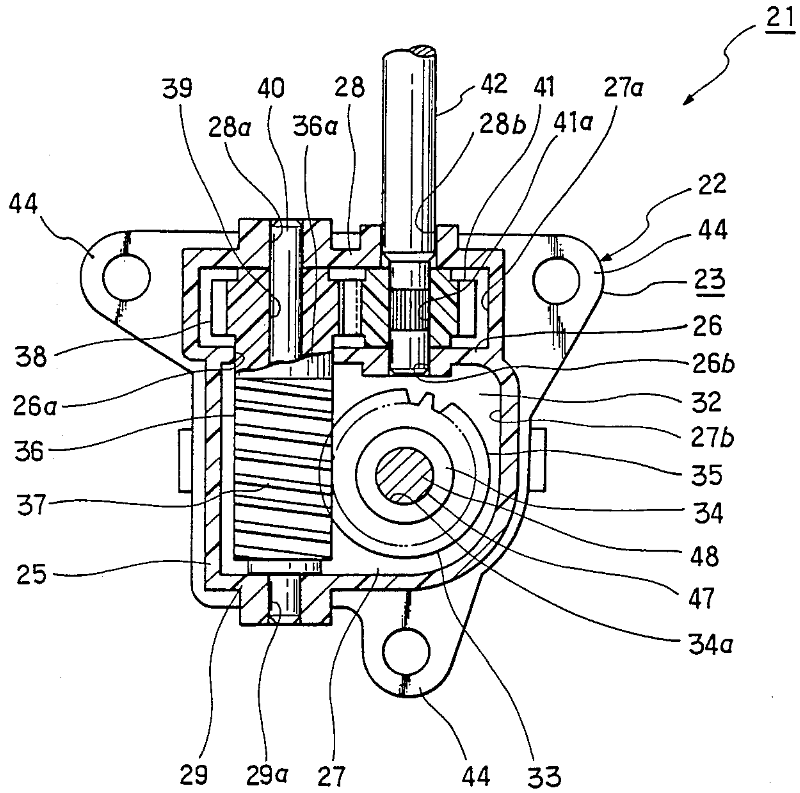
Figure 7:
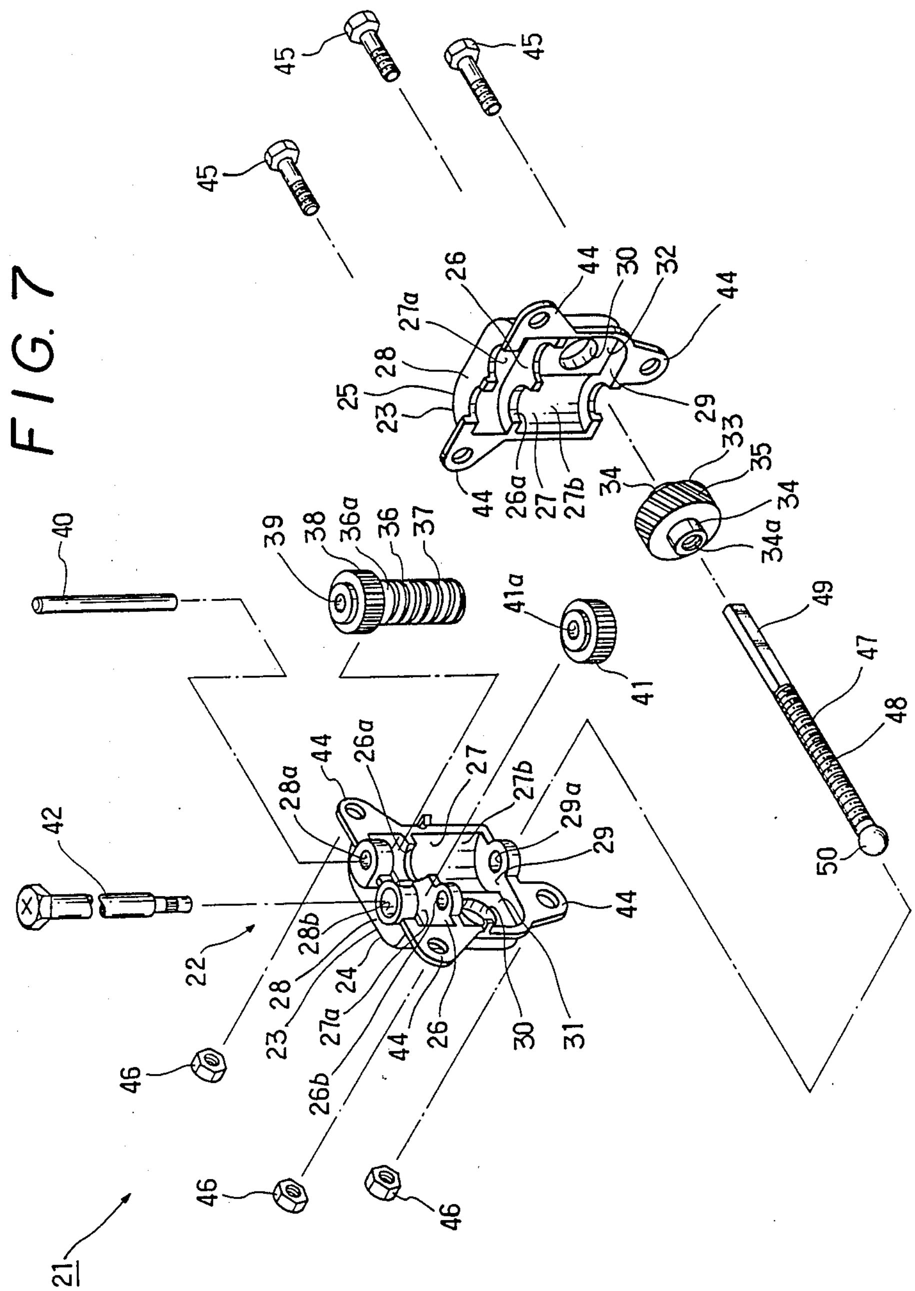

Orthogonal Gear Unit (FIG. 4, FIGS. 6 and 7)

The mechanism 21 comprises an orthogonal gear unit 22 which includes a casing 23 consiting of a front half 24 and a rear half 25 which are connected together. The casing 23 has an inner space 27 which is divided into an upper portion 27*a* and a lower portion 27*b* by a generally horizontal partition wall 26. In the left side portion of the wall 26 there is formed a circular supporting bore 26*a* for supporting a worm member 36 and, in the right side portion, there is formed a supporting bore 26*b* for supporting an actuating rod 42. Further, the worm member 36 is also supported in a supporting bore 28a formed in an upper side wall 28 of the casing 23 and in a supporting bore 29a formed in a lower side wall 29 of the casing 23. The bores 26a, 28a and 29a are aligned to each other. In the wall 28, there is also formed a bore 28b which is aligned to the bore 26b and is adapted to support the actuating rod 42.

There are formed in the front and rear walls 31 and 32 of the casing 23 bores 30 and 30 for supporting a worm wheel 33.

The worm wheel 33 includes a generally cylindrical boss portion 34 and a gear portion 35 which is integrally formed on the boss portion 34 and the center of which is disposed on an intermediate portion of the boss portion 34. Screw threads are formed in a bore 34a of the boss portion 34, and opposite end portions of the boss portion 34 are rotatably supported in the bores 30 and 30 in the casing 23.

The worm member 36 includes coaxial and integral worm gear 37 and pinion gear 38, a shaft 40 forcively fitted in the central bore 39 thereof. The worm gear 37 is disposed in the lower space 27b and the pinion gear 38 is disposed in the upper space 27a in the casing 23. The opposite ends of the shaft 40 projecting out of the worm member 36 are rotatably supported bores 28a and 29a in the casing 23. An intermediate portion 36a between the worm gear 37 and the pinion gear 38 is supported in the bore 26a in the intermediate wall 26. Thus, the worm member 36 and the worm wheel 33 are rotatably supported in the casing 23, with the worm wheel 33 engaging with the worm gear 37.

A drive pinion gear 41 is secured to the shaft 42 and is supported in the upper space 27a in the casing 23 and is engaging with the pinion gear 38. In FIG. 6, the lower end portion of the shaft 42 is forcively fitted in an axial bore 41a of the gear 41, and the shaft 42 is rotatably supported in the bore 28b in the upper wall 28 of the casing 23 and in the bore 26b in the intermediate wall 26 of the casing 23.

A rod inserting hole 43 is formed in the rear surface portion 7a of the lamp housing 7 at the lower right end portion of the headlight unit 2.

The gear unit 22 is secured to the front surface of the rear surface portion 7a of the lamp housing 7 with the worm wheel 33 being located coaxial with the inserting hole 43. There are formed mounting pieces 44, 44, projecting on the casing 23 which are secured to the lamp housing 7 through bolts 45, 45, and nuts 46, 46, in the embodiment.

Figure 3:
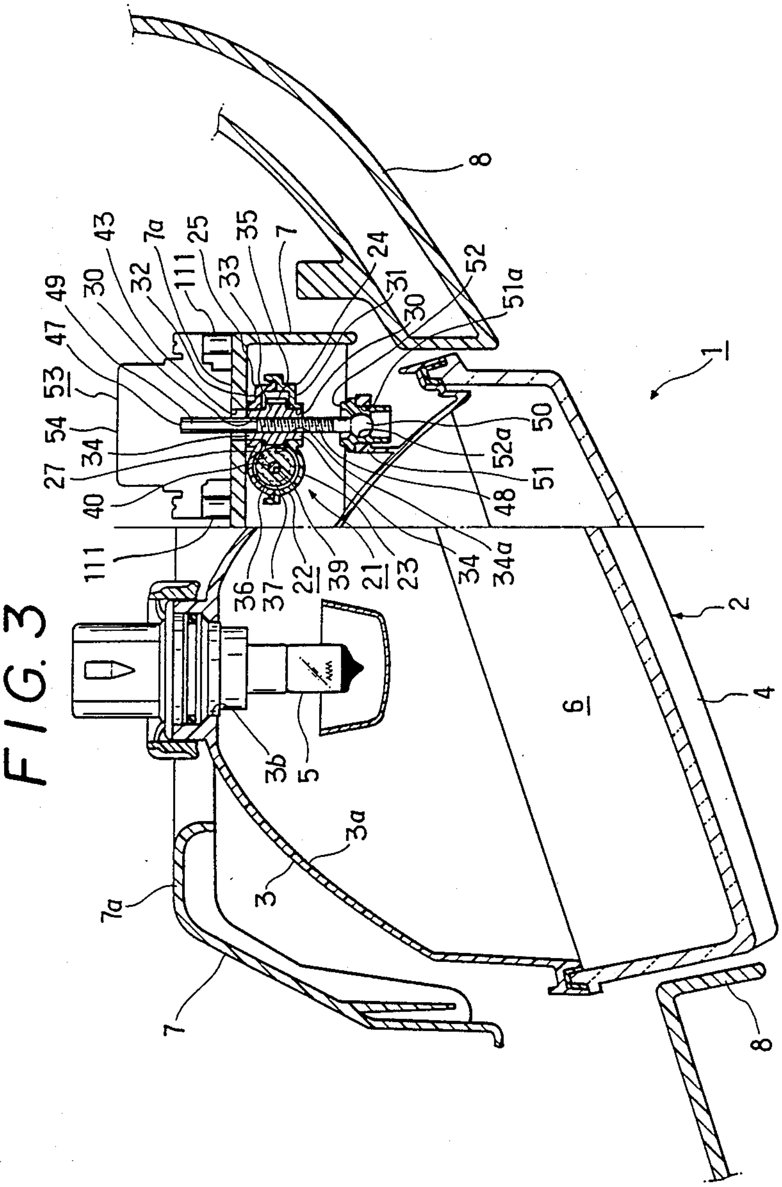

Adjust Rod (FIGS 3, 4 and 7)

Shown at numeral 47 is an adjust rod having a screw thread portion 48, a rear end portion 49 of generally oval shaped section and a spherical shaped front end portion 50.

A bracket 51 is integrally formed on the rear surface of the lamp body 3 at the lower end portion, and has a mounting hole 51. A receptacle 52 formed of a synthetic resin material is mounted in the mounting hole 51, and is formed to have a spherical recess 52a opening in the rear direction.

The screw thread portion 48 of the adjust rod 47 engages with the screw thread portion 34a of the worm wheel 33, the spherical portion 50 engages pivotally with the receptacle 52, and the rear end portion 49 extends through the rod inserting hole 43 in the lamp housing 7 in the rear direction.

The receptacle 52 and the spherical portion 50 of the adjust rod 47 define the point C aforementioned. The aiming adjustment performed by the second aiming adjust mechanism 21 will be described later.

Drive Mechanism (FIGS. 1~4, FIGS 8~10)

Shown at numeral 53 is a drive mechanism for rotating the adjust rod 47 through a remote control device.

Casing (FIGS. 1, 4, 8 and 9)

A casing 54 of the mechanism 53 is formed of a synthetic resin material and consists of a front half 55 and a rear half 56.

The front half 55 has the configuration, as viewed in the fore and aft direction, of generally rectangular lower half and an upward tapered inverted U-shaped upper half. The front half 55 has a relatively thin thickness. As shown in FIG. 1, the front half 55 of the casing 54 has a bulged lower end portion and a tubular portion 58 projecting forward. A bore 58a is formed in the tubular portion 58 and the rear end of which opens in the rear surface of a front wall 57 of the front half 55 of the casing 54.

The rear half 56 has the configuration in the front and aft direction corresponding to that of the front half 55, and the rear wall 59 of the rear half 56 has an upper portion 59a and a lower portion. As viewed in the rear direction, a generally circular bearing recess 60 is formed in the front surface of the lower central portion of the upper portion 59a.

Figure 9:
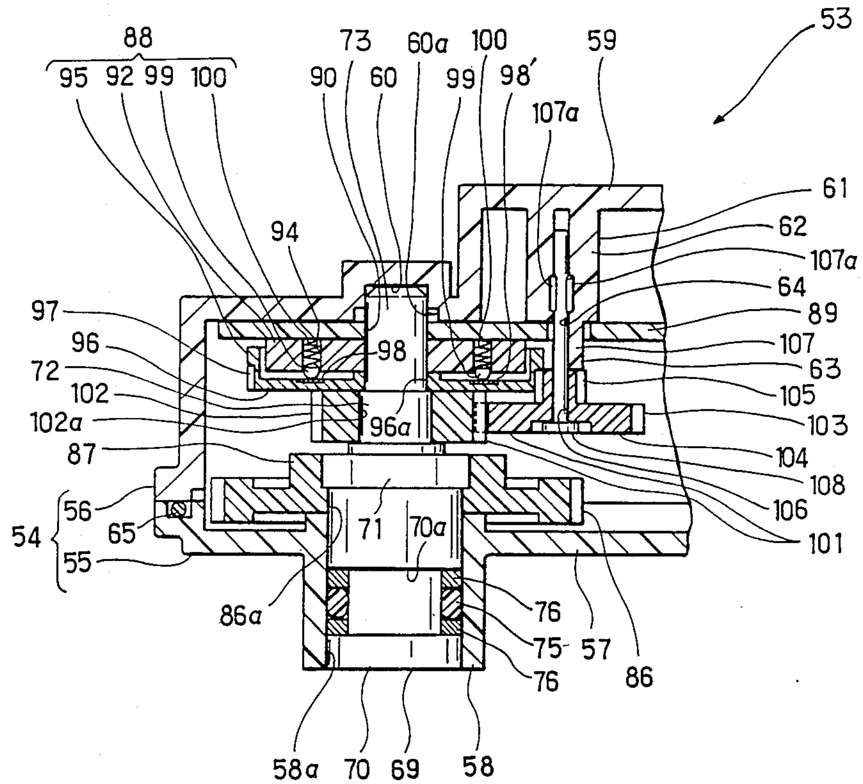

As shown in FIG. 9, a supporting projection 61 is formed on the lower portion of the rear wall 59 of the rear half 56 of the casing 54 and, consists of a large diameter rear portion 62 and a small diameter front portion 63. A supporting hole 64 is formed in the projection 61, and a part of the peripheral wall of the front portion 63 is removed such that the portion 63 has a generally C-shaped form as viewed rearward.

The front and rear halves 55 and 56 are connected to each other with a seal member 65 being disposed and clamped therebetween, and by screws 67, 67, passing through mounting lugs 66, 66, of the periphery of respective halves 55 and 56 and by nuts 68, 68.

Output Shaft (FIGS. 1, 8, 9 and 10)

The adjust rod 47 of the second aiming mechanism 21 is connected to an output shaft 69.

The output shaft 69 is an integral member formed of a metal and includes a generally tubular front portion 70, a wheel engaging portion 71 at the rear end of the front portion 70, a gear engaging portion 72 projecting from the rear surface of the wheel engaging portion 71, and a rear end portion 73 projecting from the rear surface of the gear engaging portion 72. The front portion 70 has the diameter adapted to engage with the bore 58a in the tubular portion 58 of the front half 55 of the casing 54 while, the axial length is slightly larger than the tubular portion 58. The wheel engaging portion 71 has a generally oval shape as viewed in the fore and aft direction, the gear engaging portion 72 has a generally block like shape, and the rear portion 73 is a tubular portion with the diameter being about half of the front portion 70. Further, an annular groove 70a is formed in the front portion 70.

A connecting bore 74 is formed in the front portion 70 and has an oval shape corresponding to the rear end portion 49 of the adjust rod 47, and the bore 74 extends to the gear engaging portion 72.

The output shaft 69 is rotatably supported in the casing 54, with the front portion 70 being rotatably inserted in the tubular portion 58 of the front half 55, the rear end portion 73 being rotatably inserted in the bearing recess 60 in the rear half 56. The front end of the shaft 69 is located generally flush with the front end of the tubular portion 58. An O-ring 75 and two back up rings 76 and 76 are fitted on the annular groove 70*a* so that the interior of the casing 54 is sealed from the outside parts such as the adjust rod 47 and the like.

Figure 8:
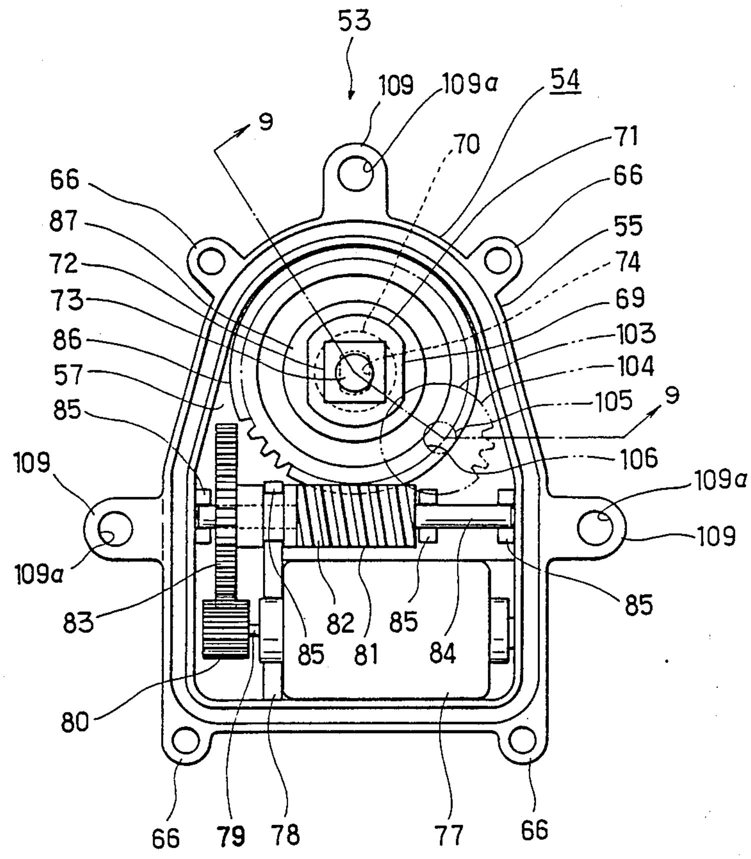

Drive Means (FIGS. 1, 8∼10)

A motor 77 having a generally oval shaped casing as viewed along its shaft which extends in the transverse direction. The motor 77 is mounted in the lower end of the casing 54 by motor supporting pieces 78 and 78′ which are formed to project from the front and rear walls 57 and 58 and are adapted to locate and secure the motor 77. A pinion gear 80 is secured to the shaft of the motor 77.

A worm member 81 is an integral member formed of a synthetic resin material and comprises a generally cylindrical worm gear 82 and a trasmitting gear 83 of a large diameter. The member 81 is supported on a shaft 84 which is supported on supporting pieces 85, 85, of the front half 55 of the casing 54. The gear 83 of the worm member 81 is engaging with the pinion gear 80 of the motor 77.

A worm wheel 86 is mounted on the rear portion of the front portion 70 of the output shaft 69 and engages with the worm gear 82 of the worm member 81. The worm wheel 86 has a central bore 86*a*, a projecting portion 87 having an oval shaped inner peripheral surface, and worm gear teeth on the outer periphery. The projecting portion 87 fittingly receives the engaging portion 71 of the output shaft 69.

Thus, when the motor 77 is rotated, the rotation is transmitted to the pinion gear 80, the transmit gear 83, the worm gear 82, the worm wheel 86 and the output shaft 69 sequentially.

Detecting Portion (FIGS. 1, 8, 9 and 10)

The position of the adjust rod 47 is detected by a detecting portion 88 which comprises a part of a circuit board, a sensor gear, a plurality of contact points, and the like. The drive mechanism 53 is disposed coaxial to the adjust rod 47 when the mechanism is mounted on the lamp housing 7.

Circuit Board

Shown at numeral 89 is the circuit board having a hole 90 in the upper central portion, and a plurality of printed terminals 91, 91, disposed around the hole 90. The circuit board 89 is fixedly mounted in the rear half 56 of the casing 54 with the rear portion 73 of the output shaft 69 passing rotatably through the hole 90.

Contact Point Retaining Plate, Sensor Gear, and Contact Point

A relatively thick disc like shaped contact point retaining plate 92 is provided. A central hole 93 is formed in the retaining plate 92 to correspond to the hole 90. Further, a plurality of contact point retaining holes 94, 94, are formed around the hole 93 and passing axially through the plate 92. The plate 92 is irrotatably connected to the circuit board 89.

Figure 10:
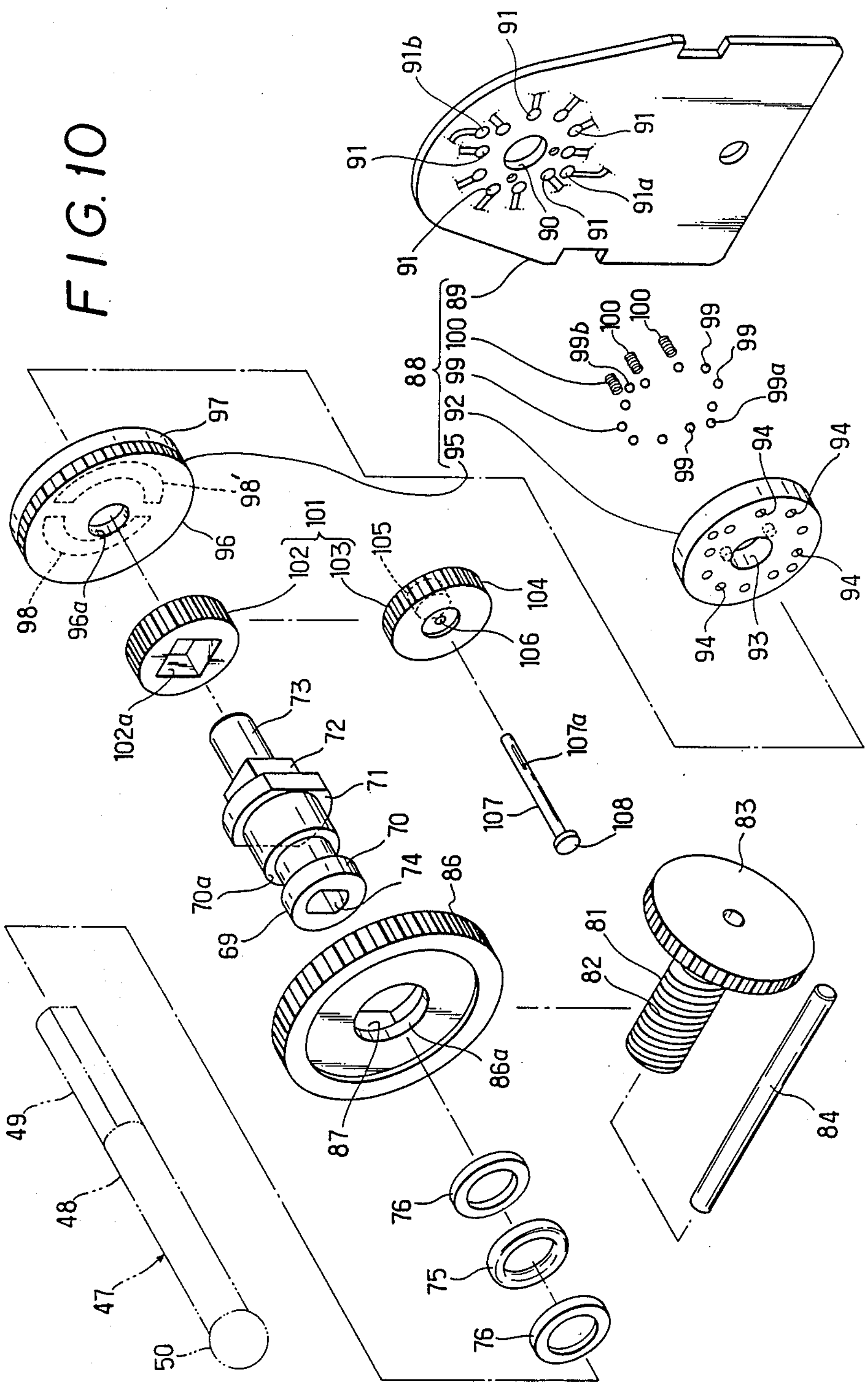

A sensor gear 95 having a disc shaped main portion 96 and an annular gear portion 97 integrally connected to the outer periphery of the main portion 96 to extend in the rear direction is provided. The gear portion 97 has gear teeth on the outer circumference. An inserting hole 96*a* is formed in the central portion of the main portion 96 and, as shown in FIG. 10, two semi-circular arc shaped conductors 98 and 98′ are mounted on the main portion 96 and around the hole 96*a*.

The contact point retaining plate 92 and the sensor gear 95 are located by the rear end portion 73 of the output rod 69 which passes rotatably through the hole 96*a* of the gear 95 and the hole 93 in the plate 92. Coil springs 100, 100, and spherical contact points 99, 99, are received respectively in the contact point receiving holes 94, 94, and connected to respective terminals 91, 91, on the circuit board 89 and cooperate with the conductors 98 and 98′ on the sensor gear 95.

Transmit Means (FIG. 1, FIGS. 8∼10)

The rotation of the output shaft 69 is transmitted to the sensor gear 95 through transmit means 101 which consists of an intermediate gear 102, a transmit gear 103 and the like.

The intermediate gear 102 is irrotatably mounted on the gear engaging portion 72 of the output shaft 69 and is disposed between the worm wheel 86 and the sensor gear 95 in the axial position. A rectangular bore 102*a* is formed in the intermediate gear 102 for fitting with the gear engaging portion 72 of the output shaft 69.

A transmit gear 103 having integrally large and small spur gears 104 and 105 is rotatably mounted on a supporting shaft 107. The shaft 107 has, as shown in FIG. 10, a large diameter head 108 on one end and axial ridges 107*a* and 107*a* near to the other end which is forcively fitted in the supporting bore 64 in the supporting projection 61 of the rear half 56 of the casing 54. The ridges 107*a* and 107*a* act to reliably secure the shaft 107 on the casing 54. Thus, the gear 103 is rotatably mounted on the rear half 56 of the casing 54. The large gear 104 engages with the intermediate gear 102 and the small gear 105 engages with the sensor gear 95.

Thus, when the output shaft 69 is rotated the sensor gear 95 is correspondingly rotated and relative position of the conductors 98 and 98′ and the contact points 99, 99, changes accordingly.

Function of Detecting Portion (FIG. 1, FIGS 8∼10)

The contact points 99, 99, are divided into two groups of first and second polarities, and two terminals 91*a* and 91*b* contacting with two contact points 99*a* and 99*b* are connected two input terminals of different polality of the motor 77 respectively. The remaining terminals are connected respectively to switching terminals of two associated rotary switches provided on a remote control means (not shown) respectively. The rotary switches are connected to a battery of the power source. When a set of switching terminals are selected in the rotary switches, an electric circuit consisting of two contact points 99 and 99 connected to the selected terminals, the conductors 98 and 98′, the motor 77 and the power source is closed and, the motor 77 rotates in a determined direction.

The rotation of the motor 77 is transmitted through the worm wheel 86 to the output shaft 69, and the sensor gear 95 is rotated. When the sensor gear 95 is rotated by a predetermined amount, the conductors 98 and 98′ separate from the selected terminals 99 and 99 so that the electric circuit opens and the motor 77 stops. Thus, the amount and the direction of the motor 77 can be determined by selecting the rotary switch.

Japanese Patent Disclosure (Kokai) 209932/1984 shows one example of a control system of the aforementioned type.

Mounting on Lamp Housing

Mounting lugs 109, 109 and 109 are formed on the casing 54 as shown in FIG. 8, and have holes 109*a*, 109*a* and 109*a* for receiving screws respectively.

The drive mechanism 53 is mounted on the rear surface of the lamp housing 7 with the rear end portion 49 of the adjusting rod 47 being inserted into the connecting bore 74 of the output shaft 69, and screws 110, 110 and 110 being inserted through the holes 109*a*, 109*a* and 109*a* in the mounting lugs 109, 109 and 109 of the casing 54 and secured to threaded holes 111*a*, 111*a* and 111*a* in bosses 111, 111 and 111 projecting from the rear surface portion 7*a* of the lamp housing 7.

The leveling actuating mechanism 53 is mounted on the rear of the second aiming adjust mechanism 21 and the adjust rod 47 and the output shaft 69 are irrotatably connected together.

Aiming Adjustment in the Vertical Direction

In performing the initial aiming adjustment in the vertical direction, the actuating shaft 42 of the second aiming adjust mechanism 21 is rotated. The rotation of the shaft 42 is transmitted through the pinion gear 41 and the worm member 36 to the worm wheel 33. The worm wheel 33 is prevented from the displacement in the fore and aft direction by the front and rear walls 31 and 32 of the casing 23 and, the adjust rod 47 threadingly engaging with the worm wheel 33 has the rear end portion 49 being inserted into the output shaft 69 of the drive mechanism 53, the rotation of which is prevented by the worm wheel 86 being integral with the output shaft 69 and engaging with the worm gear 82. Thus, the rotation of the worm wheel 33 displaces the rod 47 in the axial direction, whereby the space between the lamp housing 7 and the headlight unit 2 at the second aiming mechanism 21 changes, and the headlight unit 2 rotates around a line connecting the pivotal point A and the point B of the first aiming adjust mechanism 13, thus, the direction of the light beam is adjusted in the vertical direction.

Level Adjustment

The leveling adjustment is performed by rotating the motor 77. When the motor 77 is rotated, the rotation is transmitted through the output shaft 69 to the adjust rod 47. Since the worm wheel 33 of the aiming adjust mechanism 21 to which the adjust rod 47 is threadingly engaging is prevented from rotation the screw threads on the adjust rod 47 is threaded into or out of the threaded bore 34*a* in the worm wheel 33, so that the rod 47 is displaced in the fore and aft direction and the headlight unit 2 is tilted in the vertical direction.

The amount and the direction of the displacement of the adjust rod 47 is controlled by the detecting portion 88. Namely, the detecting portion 88 is actuated by a remote control (not shown) such that the direction of the displacement of the rod 47 is determined by direction of rotation of the motor 77 and the amount of displacement is determined by the amount of rotation of the motor 77.

Figure 11:
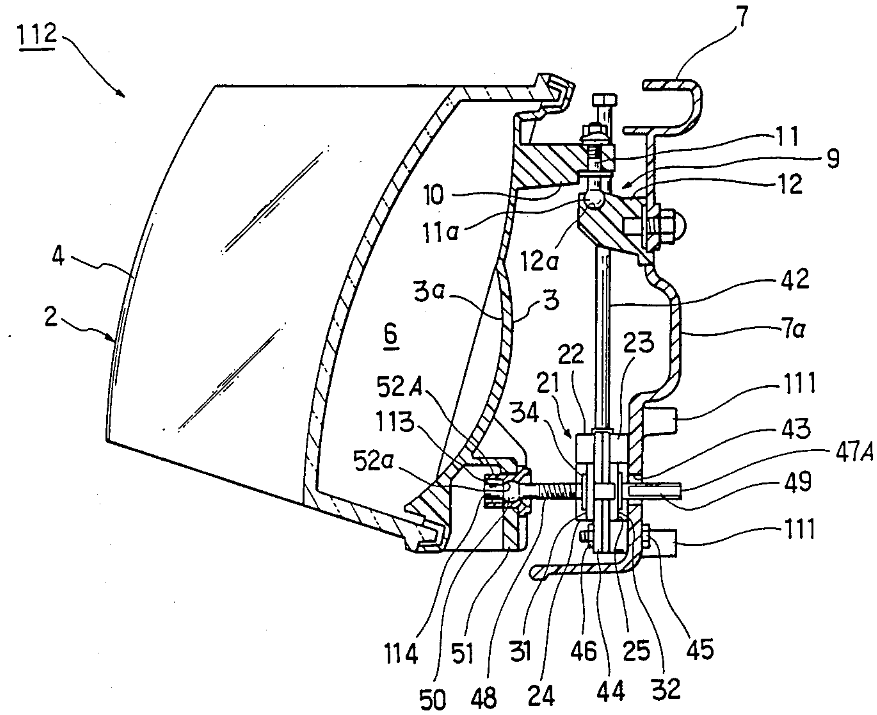

Modified Embodiment (FIG. 11)

FIG. 11 shows a modified embodiment of the present invention, wherein a headlight device 112 is not provided the leveling actuating mechanism 53 of the first embodiment, and the adjust rod 47A is irrotatably connected to a receptacle 52A of the headlight unit 2.

The adjust rod 47A is the adjust rod of the second aiming adjust mechanism 21 and the construction is nearly similar to that of the adjust rod 47, but differs in that a rectangular plate like projection 113 is formed on the front end of the spherical member 50. Shown at numeral 52A is a receptacle supported on the headlight unit 2 which construction is also nearly similar to that of the receptacle 52, but differs in that a groove like bore 114 is formed between the front end and the recessed portion 52*a*. The projection 113 engages with the bore 114. Thus, the receptacle 52A is connected irrotatably with the rod 47A, and when the shaft 42 is rotated the worm wheel 33 axially displaces the rod 47A and the headlight unit 2 is tilted.

The headlight device 112 differs from the headlight device 1 in that it is not required to modify the lamp housing 7, and that the adjust rod of the aiming adjust mechanism 21 may or may not be exchanged by another one for use the device to an application to which the levleing adjust mechanism is not required. Such modified form will not cause any functional defects.

Figure 12:
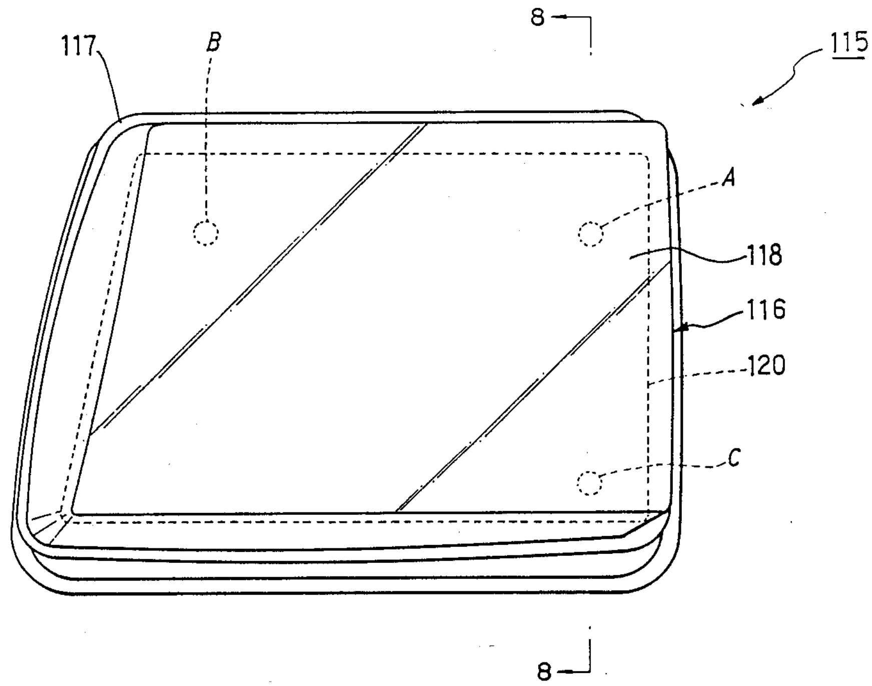
FIG. 12 is a front view of a headlight device according to a second embodiment of the invention.
Figure 13:
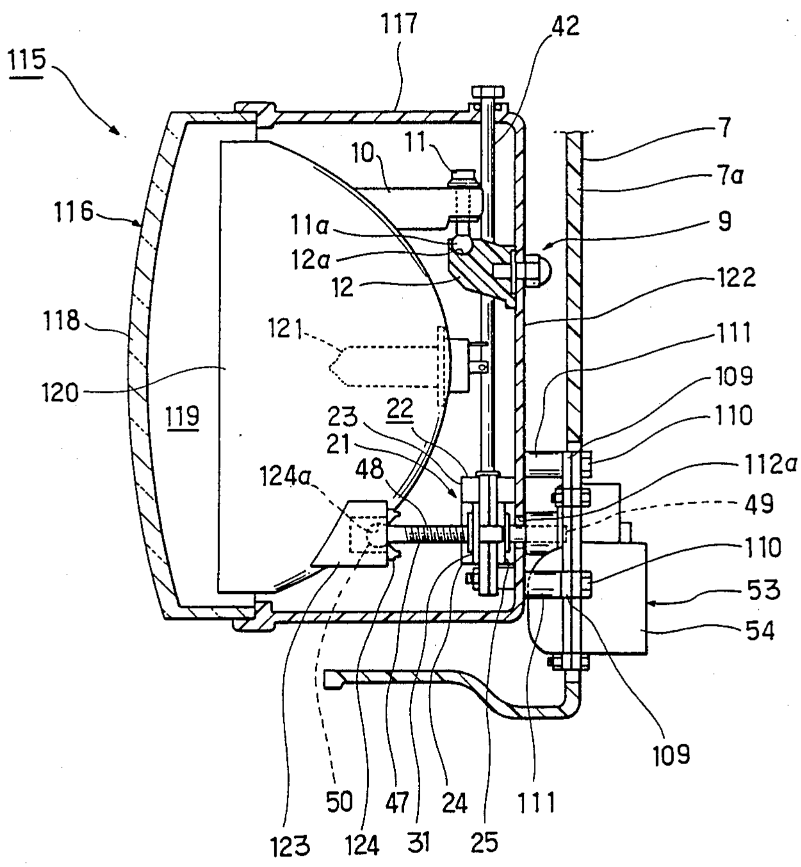
FIG. 13 is a sectional view taken along line XIII—XIII in FIG. 12.
Figure 14:
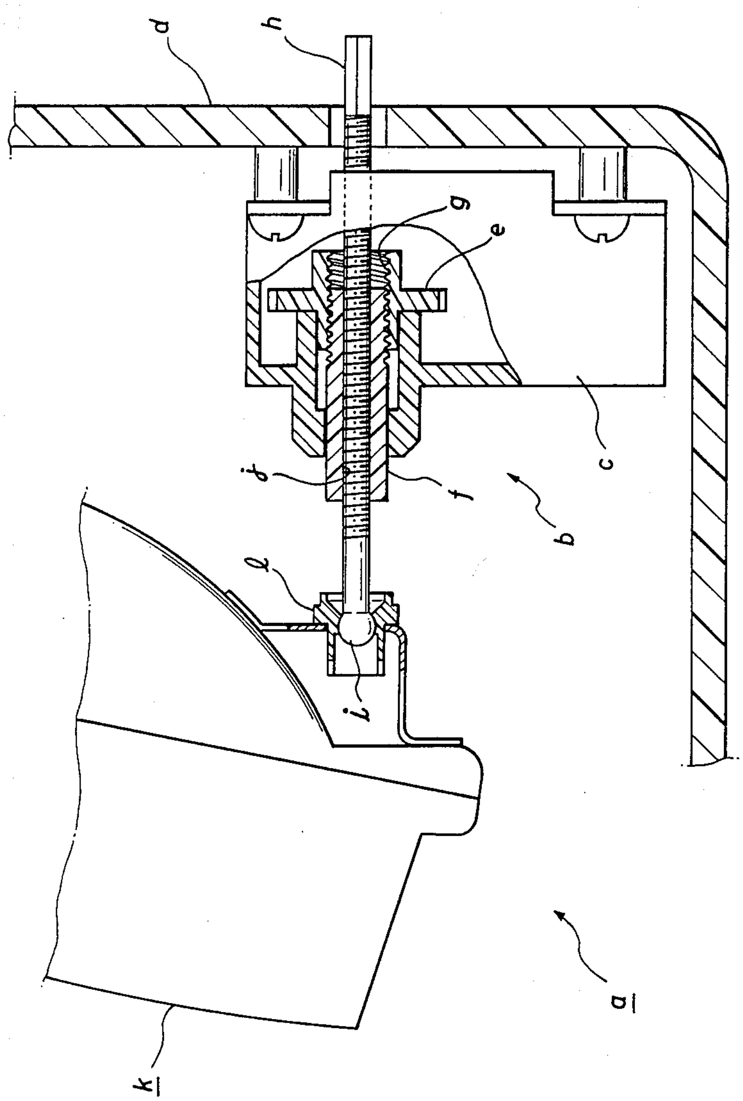
FIG. 14 is a partially broken side view showing the essential portion of one example of prior art tilting device for a vehicle headlight device.

Second Embodiment (FIGS. 12 and 13)

FIGS. 12 and 13 show the second embodiment of present invention. The headlight device 115 for use in an automobile is of the movable reflector type in which the reflector is tiltable in adjusting the direction of the light beam. In the drawings, the same numerals are applied to parts corresponding to that in the first embodiment.

Shown at numeral 116 is a headlight unit, which comprises a recessed lamp body 117 formed of a synthetic resin material and having a front open end, a lens 118 mounted on and covering the front open end, a reflector 120 disposed in a lamp space 119 which is defined between the lens 118 and the lamp body 117, an electric bulb 121 supported on the rear end portion of the reflector 120, and the like. The lamp body 117 is secured to the lamp housing 7 through mounting means not shown.

The reflector 120 is mounted on the lamp body 117 at three points A, B and C shown in FIG. 11. The point A is the pivotal support portion and is constituted of such as a ball joint and the like. The remaining two points B and C are adjust portions for adjusting the space between the reflector 120 and the lamp body 117. The point B is spaced from the point A in the horizontal direction and is constituted of an adjust mechanism similar to the first aiming adjust mechanism 13 in the first embodiment.

The adjust mechanism at the point C is constituted of that similar to the second aiming adjust mechanism 21 and the drive mechanism 53 of the first embodiment. In FIG. 13, the second aiming adjust mechanism 21 is secured to the inside of a rear wall 122 of the lamp body 117 with the rear end portion 49 of the adjust rod 47 extending through an opening formed in the rear wall 122. The drive mechanism 53 is mounted on the rear side of the rear wall 122. The spherical member 50 on the front end of the adjust rod 47 is fitted rotatably in a recess 124*a* in a receptacle 124 which is supported on a bracket 123 projecting from the reflector 120. The upper end of the actuating shaft 42 projects through the upper wall of the lamp body 117.

The reflector 120 is, when the aiming adjust mechanism at the point B is actuated, tilted around a line connecting the points A and C and generally in left and right directions. And when the adjust rod 47 is rotated or the motor 77 is actuated, the reflector is tilted generally in up and down directions around a line connecting the points A and B.

Advantage of the Invention

According to the present invention, the aiming adjust mechanism is mounted on a support member with the leveling actuating mechanism being detachably connected thereto, thus, irrespective to the presence of the leveling actuating mechanism the aiming adjust mechanism can commonly be used on various headlight device.

Further, the supporting member and the aiming adjust mechanism can commonly be used to headlight devices of different construction, thus, it is possible to reduce the number of parts thereby reducing the cost.

It will be noted that the invention is not limited to the embodiments and, various changes or modifications can easily be made by those skilled in the art within the scope of the present invention as defined by claims. For example, in the second embodiment, the aiming adjust mechanism and the drive mechanism are mounted on the lamp body which acts as the supporting member, but, it is possible to mount the aiming adjust mechanism on the lamp body and to mount the drive mechanism on the lamp housing. Further, the constitution of the gear unit may be modified to include two bevel gears and the like. Further, the output shaft of the drive mechanism may have any deisred construction provided that the output shaft is irrotatably and slidably connectable to the rear end of the adjust rod.

What is claimed is:

1. A tilting device of a vehicle headlight having a tiltable member which is tiltably supported on a supporting member and is tilted in changing the direction of the light beam; the tilting device comprises:

- an adjust rod being supported on the supporting member with the front end being connected to the tiltable member and a rear end of the adjust rod projecting rearward of the supporting member, said adjust rod being displaceable in the fore and aft directions when rotated, and
- a drive mechanism for rotating said adjust rod and being mounted on the rear surface of the supporting member;
- said drive mechanism is connected to said adjust rod and comprises an output shaft slidably and irrotably connected to the rear end of said adjust rod, detecting means for detecting the position of the adjust rod and disposed coaxially with the output shaft, drive means for rotating the output shaft and transmit means for transmitting the rotation of the output shaft to a rotatable portion of the detecting means.

2. A tilting device of a vehicle headlight according to claim 1, in which the tiltable member is a headlight unit including a recessed lamp body having a front opening, a lens covering the front opening of the lamp body and a light source disposed in a lamp space which is defined between the lamp body and the lens; and the supporting member is a lamp housing secured to a body of the vehicle.

3. A tilting device of a vehicle headlight according to claim 1, in which the tiltable member is a reflector supporting a light source and disposed in a lamp space which is defined by a lamp body having a recessed portion and being secured to the body of the vehicle and a lens covering a front opening of the recessed lamp body; and the supporting member is the lamp body.

4. A tilting device of a vehicle headlight having a tiltable member which is tiltably supported on a supporting member and is tilted in changing the direction of the light beam, the tilting device comprising:

- an adjust rod supported by said support member with the front end of said adjust rod being connected to the tiltable member, said adjust rod being displaceable in the fore and aft directions when rotated, and;
- a drive mechanism for rotating said adjust rod and being mounted on said supporting member;
- said drive mechanism comprises an actuating rod having:
- a first means for aiming said vehicle headlight comprising an interiorly threaded boss which is mounted on said support member through which said adjust rod passes, and means to rotate said threaded boss; and
- an adjustment means comprising a hollow shaft which does not rotate with respect to said adjust rod, and which permits axial movement between said hollow shaft and said adjust rod whereby when said hollow shaft is rotated, said adjust rod rotates and moves axially with respect to said threaded boss.

* * * * *